(12) United States Patent
Glenn et al.

(10) Patent No.: US 8,187,423 B1
(45) Date of Patent: May 29, 2012

(54) FIBER REINFORCED COMPOSITES

(75) Inventors: Gregory M. Glenn, American Canyon, CA (US); Charles N. Ludvik, Moraga, CA (US)

(73) Assignee: The United States of America as represented by the Secretary of Agriculture, Washington, DC (US)

( * ) Notice: Subject to any disclaimer, the term of this patent is extended or adjusted under 35 U.S.C. 154(b) by 858 days.

(21) Appl. No.: 11/431,496

(22) Filed: May 9, 2006

(51) Int. Cl.
*D21H 11/00* (2006.01)

(52) U.S. Cl. ............... 162/181.8; 162/145; 162/141; 264/328.1; 264/320; 264/322; 264/544; 264/316; 264/333

(58) Field of Classification Search ............... 264/544
See application file for complete search history.

(56) References Cited

U.S. PATENT DOCUMENTS

| | | | |
|---|---|---|---|
| 3,510,394 A * | 5/1970 | Cadotte ................ | 162/145 |
| 4,031,285 A | 6/1977 | Miller et al. | |
| 4,248,664 A * | 2/1981 | Atkinson et al. .......... | 162/145 |
| 4,303,019 A * | 12/1981 | Haataja et al. ........... | 108/57.28 |
| 4,351,867 A | 9/1982 | Mulvey et al. | |
| 4,536,360 A * | 8/1985 | Rahrig ................... | 264/142 |
| 4,704,989 A * | 11/1987 | Rosenfeld ............... | 119/173 |
| 4,717,742 A | 1/1988 | Beshay | |
| 4,876,151 A | 10/1989 | Eichen | |
| 4,985,119 A | 1/1991 | Vinson et al. | |
| 5,643,359 A * | 7/1997 | Soroushian et al. ........ | 106/805 |
| 5,897,701 A | 4/1999 | Soroushian et al. | |
| 6,379,446 B1 | 4/2002 | Andersen et al. | |

OTHER PUBLICATIONS

Anil N. Netravali, Shitij Chabba, Composites get greener, Materials Today, vol. 6, Issue 4, Apr. 2003, pp. 22-29, ISSN 1369-7021, DOI: 10.1016/S1369-7021(03)00427-9. (http://www.sciencedirect.com/science/article/B6X1J-4893M85-Y/2/fd810cc22328ffb7a7be6c71a9267b19).*

Imam, S. H., P. Cinelli, S.H. Gordon, and E. Chiellini "Characterization of Biodegradable Composite Films Prepared from Blends of (Vinyl Alcohol), Cornstarch, and Lignocellulose Fiber" J. of Polymers and the Environment (2005) 13 (1):47-55.

* cited by examiner

*Primary Examiner* — Christina Johnson
*Assistant Examiner* — Benjamin Schiffman
(74) *Attorney, Agent, or Firm* — Elizabeth R. Sampson; Leslie Shaw; John D. Fado

(57) ABSTRACT

In one aspect, the invention is directed to an efficient and economical process for dispersing fiber in water and clay. In another aspect, the process for dispersing fiber in water and clay is used in methods of making fiber reinforced composite products. In another aspect, the dispersed fiber/clay material is formulated to make products which include, but which are not limited to, fiber reinforced thermoplastic composites, paperboard products, kitty litter, and/or lightweight building materials comprising fiber.

27 Claims, No Drawings

FIBER REINFORCED COMPOSITES

FIELD OF THE INVENTION

The invention relates fiber reinforced composites and methods of making fiber reinforced composites.

BACKGROUND OF THE INVENTION

Among modern structural materials fiber reinforced composites are superior. Fiber reinforced composites provide products that are low density, and high strength, and which also exhibit excellent durability and design flexibility. Thus, fiber reinforced composite materials are now widely used in industries that manufacture aircraft, automobiles, boats and ships, building materials, furniture, household products, and sports equipment to name a few.

The best quality fiber reinforced composites are made with well dispersed fiber which has a relatively long length. Not only does well dispersed fiber improve the appearance of the composite materials, the strength of fiber-reinforced materials is highest if the fiber length is long, and the fiber is well dispersed in the matrix that forms the basis of the product. Indeed, poor dispersion of fiber (fiber clumps) reduces the advantage of fiber in the composite and may even weaken the composite compared to the fiber free material.

Unfortunately, dispersing fiber uniformly is not readily accomplished with conventional technologies. Indeed, conventional technologies for fiber dispersal require high speed, high shear mixing. As a result, conventional methods risk shearing and shortening of the fibers and therefore, weakening of the composite (see e.g., U.S. Pat. No. 4,717,742 and Sanadi et al. Cellulose, Paper, and Textile Division of the American Chemical Society, Spring 1998 Newsletter (http://www.fpl.fs.fed.us/documnts/pdf1998/sanad98a.pdf). Thus, fibers are often difficult to process into composites, making quality fiber reinforced composites technically difficult to achieve, and therefore expensive to make.

Various methods have been devised in an attempt to overcome the problems associated with dispersing fiber in composite mixtures, but none have so far achieved satisfactory results. For example, U.S. Pat. No. 6,379,446 discloses methods which employ gelatinized or pre-gelatinized starch as a fiber dispersant. Although this technology disperses the fiber, unfortunately, the starch gives undesirable properties to the mixture e.g., very poor water resistance and poor stability for high temperature processing such as extrusion, injection molding and thermoforming.

Thus, there is a need in the art for quality fiber reinforced composite products, and for efficient and cost effective methods for making them.

Fortunately, the present inventors have discovered a method for substantially uniformly dispersing fiber in aqueous mixtures. Such mixtures can subsequently be used for the cost effective production of a wide array of quality fiber reinforced composite products. Thus, the invention fulfills the need for low cost, quality fiber reinforced composite products, and provides effective and cost effective methods for the production of such products.

SUMMARY OF THE INVENTION

It has now been discovered that fiber is readily dispersed in an aqueous mixture using clay as a dispersant. Fiber reinforced composites made using clay to disperse fiber in an aqueous mixture, have good mechanical properties, excellent moisture resistance and high temperature stability. Thus, in one aspect, the present invention provides a method for substantially uniformly dispersing fiber in an aqueous clay mixture. The method comprises combining a mass of fiber with water; mixing the combined fiber and water to form a mixture; adding a clay to the mixture; and mixing thoroughly to produce a dispersed fiber/clay matrix.

In an exemplary embodiment, the fiber is selected from the group consisting of a pulped cellulosic fiber, an unpulped cellulosic fiber, a synthetic fiber, and a glass fiber or a combination of such members. In another exemplary embodiment, the pulped cellulosic or unpulped cellulosic fiber is a plant derived fiber selected from the group consisting of fiber from hardwood, softwood, cotton, jute, ramie, hemp, sisal, kenaf, and straw, or a combination of such members. In another exemplary embodiment, the fiber is a virgin fiber. In another exemplary embodiment, the fiber is a recycled fiber. In still another exemplary embodiment, the fiber is a synthetic fiber is selected from the group consisting of biodegradable synthetic fibers and non-biodegradable synthetic fibers, or a combination of such members.

In another exemplary embodiment, the clay is selected from the group consisting of sodium bentonite clay, kaolin clay, montmorillonite clay, fuller's earth clay, calcium bentonite clay and attapulgite clay or a combination of such members.

In another aspect, the method for substantially uniformly dispersing fiber in an aqueous clay mixture further comprises adding one or more additives selected from the group consisting of water, a thermoplastic, cement, fillers, processing aids, and binders; and mixing thoroughly. In an exemplary embodiment, the method is used to produce a product selected from the group consisting of paperboard products, reinforced thermoplastic products, kitty litter and low density building materials or a combination of such members.

In an exemplary embodiment, the binder is selected from the group consisting of a cellulose ether, a lignosulfonate, a polyvinylalcohol, a sugar, an oligosaccharide, and a polysaccharide or a combination of such members. In another exemplary embodiment, the binder and clay are present in a binder to clay ratio that is in a range of between about 0.01:1 to about 0.2:1.

In another aspect, the invention provides a method for making a fiber reinforced low density building material. The method comprises: combining a mass of fiber with water; mixing the combined fiber and water to form a mixture; adding a clay to the mixture; mixing thoroughly to produce a dispersed fiber/clay matrix; adding one or more additives selected from the group consisting of water, a cement, fillers, processing aids, and binders; and mixing thoroughly. In an exemplary embodiment, the filler is selected from the group consisting of calcium carbonate, talc, gypsum, perlite, aggregate, sand, ash, and starch or a combination of such members.

In another aspect, the invention provides a low density building material. In an exemplary embodiment, the low density building material comprises a hydraulically settable cement. In another exemplary embodiment, the low density building material comprises clay and fiber present in a clay to fiber ratio that is in a range of between about 0.6:1 to about 3:1; and fiber and cement present in a fiber to cement ratio that is in a range of between about 1:1 to about 1:30.

In another aspect, the invention provides a method for making a fiber reinforced thermoplastic product, the method comprising: combining a mass of fiber with water; mixing the combined fiber and water to form a mixture; adding a clay to the mixture; mixing thoroughly to produce a dispersed fiber/clay matrix; adding one or more additives selected from the group consisting of water, a thermoplastic polymer, fillers, processing aids, and binders or a combination of such members; mixing thoroughly; rolling the mixture into sheets; drying the rolled sheets; heating the dried sheets to make the sheets flexible, and thermoforming the dried sheets into target shapes. In an exemplary embodiment, the binder is a thermoplastic polymer or a wax.

In another exemplary embodiment, the filler is selected from the group consisting of calcium carbonate, talc, gypsum, and starch or a combination of such members, and the filler and clay are present in a filler to clay ratio that is in a range that is between about 0.1:1 to about 7:1. In another exemplary embodiment, the processing aid is selected from the group consisting of mold release agents, plasticizers, and lubricants or a combination of such members. In another aspect, the invention provides a fiber reinforced thermoplastic product made according to this method.

In another aspect, the invention provides a method for making a fiber reinforced thermoplastic product, the method comprises: combining a mass of fiber with water; mixing the combined fiber and water to form a mixture; adding a clay to the mixture; mixing thoroughly to produce a dispersed fiber/clay matrix; adding one or more additives selected from the group consisting of water, a thermoplastic polymer binder, a filler, a processing aid, and other binders; mixing thoroughly; pelletizing the mixture to form pellets; drying the pellets; isolating the pellets; blending the isolated, dried pellets are blended with a thermoplastic material by heating the pellets; and extruding the heated pellets in combination with a thermoplastic polymer to form rods; pelletizing the rods; and processing the pelletized rods in an injection-molding machine to form a reinforced thermoplastic product. In another aspect the invention provides a fiber reinforced thermoplastic product made according to this method.

Other features, objects and advantages of the invention will be apparent from the detailed description which follows.

DETAILED DESCRIPTION OF THE INVENTION

Definitions

As used herein, the phrase "substantially uniformly dispersing fiber" refers to a process that disperses fiber to an extent that no fiber clumps exist in the mixture. Indeed, when fiber is "substantially uniformly dispersed" each fiber is an "individually dispersed fiber". For example, fibers are "substantially uniformly dispersed" when no fiber is visible in the mixture without magnification. Fibers are "substantially uniformly dispersed" when for example, no fiber clumps can be felt when the fiber containing mixture is felt between the thumb and index finger. Fibers are "substantially uniformly dispersed" when for example, a dollop of the mixture is placed between two pieces of Plexiglas, no fiber clumps are seen. In general fibers are "substantially uniformly dispersed" when each fiber is an "individually dispersed fiber". The condition of each fiber being an "individually dispersed fiber" is detected by any convenient means for detecting fiber dispersal.

The term "fiber" as used herein refers to any plant-derived cellulosic or lignocellulosic fiber or synthetic polymeric fiber. "Fibers" and "fibrous materials" generally include organic fibers, typically plant-derived fibers. Plant derived fibers are typically "cellulosic fiber" which refers to the fact that the fiber comprises cellulose. The term "cellulosic fiber" as used herein is a broad term that includes all cellulose containing fibers, such as, for example "lignocellulosic fiber". "Lignocellulosic fibers" comprise lignin as well as cellulose, and are typically derived from woody plants e.g., softwood and hardwood trees.

In general, any fiber that will improve the strength, flexibility, toughness, or other desired property of the fiber reinforced composite is useful in the present invention. As noted above, the term includes cellulosic fibers e.g., fibers obtained from hardwood e.g., eucalyptus and birch, and/or softwood e.g., spruce, pine, fir, larch and/or hemlock. The term also includes, but is not limited to fibers obtained from different parts of a plant e.g., bast, seed or leaf fibers e.g., rice, cotton, linen, jute, flax, hemp and/or straw.

The term "fiber" also includes recycled fibers, virgin fibers, or a mixture of the two. The term "recycled fibers" or "recycled fiber" refers to fibers that are derived from used materials that are broken down and remade into new products. In an exemplary embodiment, "recycled fibers" include recycled cellulosic fibers. In another exemplary embodiment, "recycled fibers" include low cost sources such as recycled newsprint. In contrast to recycled fibers, the term "virgin fibers" or "virgin fiber" as used herein, refers to any non-recycled fiber. The fiber, whether "recycled" or "virgin", may be in sheet or bulk form. The fiber may also be pre-moistened as in a wet lap.

The term "fiber" also includes pulped fiber. Pulped fiber is typically used when it is desirable to minimize the amount of lignin in the final product. Plant pulp is derived from wood or non-wood plants through pulping processes which use mechanical, thermal and/or chemical means known in the art. Examples of plant pulp include kraft, sulfite, mechanical, thermomechanical, chemi-thermomechanical, and combinations thereof. Both non-wood and wood plants and plant parts may be used as the raw materials in the pulping process. Pulp can also be made out of waste paper and paperboard.

The term "fiber" also includes "synthetic fibers". The term "synthetic fiber" as used herein, refers to fibers that are man-made fibers. Typically, "synthetic fibers" are made from synthetic chemicals by physical processes. Exemplary "synthetic fibers" include e.g., nylon, polyester, acrylic polymers, polyethylene, polypropylene, polylactic acid, and/or polyacrylonitrile. "Synthetic fibers" may be either biodegradable, or non-biodegradable fibers.

Non-biodegradable synthetic fibers are typically made from petrochemical sources rather than arising from natural materials. Polyethylene, polypropylene, and nylon are exemplary non-biodegradable synthetic polymeric fibers. In contrast, biodegradable "synthetic fibers" are man-made fibers that are "biodegradable".

The term "biodegradable" as used herein refers to a composition or substance that decays and becomes absorbed by the environment. A biodegradable substance is capable of decaying through the action of living organisms typically, through the action of living organisms such as bacteria and fungi. Biodegradation of biodegradable substances such as food, sewage, biodegradable synthetic fibers, and biodegradable fiber reinforced composites, typically leads to compaction and liquefaction, and to the release of nutrients that are then recycled by the ecosystem. Exemplary "biodegradable synthetic fibers" include, but are not limited to e.g., polylactic acid. Cellulosic fibers are biodegradable.

The term "clay" as used herein, refers to any type of aluminum silicate based material. Typically clay particles are less than 2 μm in diameter, and are distinguished from other small particles present in soils e.g., from silt, by their small size, flake or layered shape, affinity for water and high plasticity index. The three main groups of clays are kaolinite-serpentine, illite, and smectite. Some exemplary "clays"

which fall into these groups include, but are not limited to, sodium bentonite, kaolin, montmorillonite, fuller's earth, calcium bentonite and attapulgite.

In an exemplary embodiment, sodium bentonite clay is used for efficiently dispersing fiber. Bentonite clay is an absorbent aluminium phyllosilicate clay comprised largely of montmorillonite, $(Na,Ca)_{0.33}(Al,Mg)_2Si_4O_{10}(OH)_2 \cdot nH_2O$. In addition to functioning as a fiber dispersant, "clays" are used in exemplary embodiments as components of the composite to e.g., enhance whiteness of the final product e.g., using kaolin clay.

The term "composite" as used herein, is a broad term that refers to a blended substance comprising more than one part or ingredient. In exemplary embodiments, "composites" are "fiber reinforced composites". Typically "composites" or "composite materials" are engineered materials made from two or more constituent materials which together form a single component, but wherein at the same time the constituent materials remain separate and distinct on a macroscopic level. Typically composites are described as combinations of at least two materials in which one of the materials, called the reinforcing phase, is in the form of fibers, sheets, or particles, and is embedded in the other materials which are called the matrix phase. The reinforcing phase and the matrix phase may each be comprised of more than one substance e.g., more than one type of fiber may function as the reinforcing phase in the same composite material. Similarly, the matrix may comprise more than one component e.g., concrete which functions as a matrix component in exemplary fiber reinforced composites comprises an aggregate e.g., gravel and sand, and cement binder.

Composites, e.g., fiber reinforced composites, are used because overall properties of the composites tend to be superior to those of the individual components. The strength of the composite depends to a large degree on the amount, arrangement and type of fiber (or particle) reinforcement in the matrix. Typically, the higher the reinforcement content, the greater the strength. However, the actual strengthening benefit to the composite due to the fibers will depend on the stress transfer efficiency from the matrix to the fibers. The stress transfer efficiency varies according to the fiber length distribution present in the composite and the type of fiber-matrix interfacial interactions occurring.

The term "cement" as used herein, is a generic term that can apply to all binders. The term "cement", refers in general, to powdered materials which develop strong adhesive qualities when combined with water and form a hardened matrix. Cement is an important ingredient in concrete. Exemplary "cements" include, but are not limited to, hydraulic limes, natural pozzolana and/or Portland cements. Portland cement is currently the most common type of cement in general usage. In general, Portland cement comprises a mixture of oxides of calcium, silica and aluminium. Portland cement and similar materials are made by heating limestone (as source of calcium) with clay or sand (as source of silica) and grinding the product (clinker), with a source of sulfate (most commonly gypsum). The resulting powder, when mixed with water, will become a hydrated solid over time. Because it solidifies through the process of hydration, and can set underwater, Portland cement is referred to as a "hydraulically settable cement". Thus, a "hydraulically settable cement" refers to cementitious materials that require water to hydrate the components in order to set.

Gypsum plaster and common lime are not hydraulic cements. Indeed, gypsum plaster, which is also known as gypsum cement, or plaster of Paris, is a type of building material based on calcium sulfate hemihydrate, which hardens, or sets, by drying.

The term "filler" designates a component not otherwise categorized in a formulation. Fillers are typically low cost materials used to reduce the cost of producing a composite material, as well as the cost of the final product. In exemplary embodiments, fillers influence product density, and in some embodiments fillers influence mechanical properties. Some exemplary inorganic fillers include, but are not limited to rock aggregate, calcium carbonate (limestone), talc and gypsum. Some exemplary organic fillers include, but are not limited to starches.

The term "binder" in this disclosure describes a material that facilitates binding elements of a matrix or composite. For example, a "binder" e.g., hydroxypropylcellulose or carboxymethylcellulose can be used to facilitate the binding of the clay and dispersed fiber during processing. Binders enhance greater mechanical strength in the dry clay/fiber matrix and thereby preventing separation of clay and fiber during processing. Some exemplary binders include, but are not limited to: cellulose ethers (e.g., carboxymethylcellulose, hydroxypropylcellulose, hyroxyethylcellulose, methycellulose), lignosulfonates, polyvinylalcohol, sugar, oligosaccharide or polysaccharide solutions.

The term "processing aid" as used herein refers to any additive used to assist in processing products produced by the methods disclosed herein. For example, an exemplary "processing aid" is a "mold release", such as e.g., erucamide, which is a processing aid used to avoid parts sticking to the mold in the injection-molding step.

The term "mold release agent" as used herein refers to an additive used to prevent or reduce parts sticking to the mold during a processing step of injection molding, compression molding or thermoforming. Mold release agents are typically include e.g., fatty acids, salts of fatty acids, or amides of fatty acids. Some exemplary "mold release agents" include e.g., erucamide, stearic acid, salts of stearic acid, stearamide, oleamide, and N,N'-ethylenebis(stearamide).

The term "plasticizer" as used herein refers to any compound that is added to a polymer to increase softness, flexibility and toughness or the final product, and/or is added to the polymer to facilitate processing. Typical plasticizers include e.g., polyols (glycerin, ethylene glycol, triethylene glycol, sorbitol, diethylene glycol dibenzoate), esters of phthalic acid (dioctyl phthalate), epoxidized vegetable oils (soybean, linseed), esters of fatty acids (stearic acid, oleic acid, palmitic acid, sebacic acid) and esters of phosphoric acid.

The term "lubricant" as used herein refers to "lubricants" as used in polymer processing. As is known in the art a lubricant in polymer processing refers to an additive used to enhance polymer flow. Typically, lubricants include, but are not limited to vegetable oils and mineral oils.

The term "thermoplastic" as used herein refers to a material that is plastic or deformable, melts to a liquid when heated above its melting point, and freezes to a glassy or semi-crystalline state when cooled sufficiently. Typically thermoplastics are high molecular weight polymers whose chains associate through weak van der Waals forces e.g., polyethylene, stronger dipole-dipole interactions and hydrogen bonding e.g., nylon, or stacking of aromatic rings e.g., polystyrene. Thermoplastic polymers can remelted and remolded once formed and cured. Some exemplary thermoplastic materials are addition polymers e.g., vinyl chain-growth polymers e.g., polyethylene and polypropylene.

The term "low melting thermoplastic polymer" is a relative term. For example, the term "low melting thermoplastic polymer" indicates that the melting point of the thermoplastic polymer or polymer blend is achievable during high temperature processing conditions, e.g., drying or thermoforming. By attaining and/or exceeding the melting point of the thermoplastic, the processing conditions melt the polymer so that it is of relatively low viscosity. The low viscosity polymer will associated more closely with fiber, clay and other additives in the matrix. In an exemplary embodiment, the melted low melting thermoplastic polymer functions as a pliable binder making the matrix more homogenous. Some exemplary "low melting thermoplastic polymers" include, but are not limited to paraffin and polyethylene waxes, polybutyleneadipate/terphthalate copolymer (Ecoflex), polyethylene, and polypropylene.

The term "thermoplastic material" as used herein, refers to any thermoplastic composition of matter e.g., blends of polylactic acid and polybytyleneadipate/terphthalate.

The term "thermoplastic polymer" as used herein, refers to polymers which are thermoplastic e.g., polystyrene, polylactic acid.

The term "thermoforming" as used herein, refers to forming a thermoplastic material, typically a sheet of material, by heating the material above its melting point and fitting the sheet to a mold, typically, though not necessarily exclusively, via pressure or vacuum. After cooling the thermoplastic below its melting or softening point, it is removed from the mold. This technique can be used for a wide variety of thermoplastic materials and composites, including, but not limited to polyolefins, polystyrene, and polyesters.

The term "target shapes" as used herein refers to shapes, forms, surfaces and/or external outlines into which fiber reinforced thermoplastics are formed. Fiber reinforced thermoplastics can be formed into any shape or form e.g., squares, circles, triangles, rectangles, cubes, pyramids, stars, chairs, loungers, beds, boxes, spheres, boats, rods, beams, balls, cones, u-shape, horseshoe, animal, car, plant, insect, etc, that is any convenient and/or desirable shape.

The term "starch" as used herein refers to a carbohydrate compound having the formula $(C_6H_{10}O_5)_n$, where the subscript "n" denotes the total number of glucose monomer units. Typically, starches are comprised of the polysaccharides amylose and amylopectin. The amylose polysaccharide is comprised primarily of glucose monomer units joined to one another in α-1,4 linkages. Amylose is typically considered a linear molecule, however some minor branching sometimes is found. Typically, amylose polymers range in length from between about 500 to about 20,000 glucose monomer units, although any length is possible. Amylopectin is also comprised of glucose monomer units, but is not usually considered to be a strictly linear molecule. Instead, the polysaccharide comprises α-1,4 linked glucose monomers interspersed at intervals with branches formed by glucose monomers in α-1,6 linkage (see e.g., Advances in Food and Nutrition Research, Vol. 41: *Starch: Basic Science to Biotechnology*, Mirta Noemi Sivak and Jack Preiss eds. Academic Press (1998) which is incorporated herein by reference in its entirety).

The relative content of amylose and amylopectin in starch can vary. Typically, amylose comprises about 20% to about 25% to about 30% of the starch, but may be present in higher concentrations as well. For example "high-amylose corn starch" (HACS) comprises at least about 40% amylose, and in some embodiments comprises about 50%, about 55%, about 60%, about 65%, about 70%, about 75% amylose, and in other embodiments comprises about 80% amylose or about 85% amylose. Amylopectin on the other hand, typically comprises about 70% to about 75%, to about 80% of the starch, but may occur in higher proportions or lower proportions as well, e.g., waxy corn starch may comprise more than 99% amylopectin, and HACS may comprise as little as 15% amylopectin or less.

Starch is found in nearly every type of plant tissue including, but not limited to the fruit, seeds, stems, leaves, rhizomes and/or tubers. Thus, many starches are plant derived starches or "plant starch". Typically, starch produced in the USA is derived from corn, potatoes, rice, and wheat. However, useful starches can come from any source e.g., seeweed, arrowroot, guar gum, locust bean, tapioca, arracacha, buckwheat, banana, barley, cassaya, konjac, kudzu, oca, sago, sorghum, sweet potato, taro, yams and beans e.g., favas, lentils and peas.

The term "starch" as used herein, can also refer to "modified starch" which has been modified by human intervention such that it differs from the raw, unmodified form as extracted from a plant. For example, starch can be modified by methods known in the art such as e.g., by chemical crosslinking and/or by stabilization through the introduction of anionic groups to the starch granule.

I. Introduction:

Dispersed fiber improves the mechanical properties and appearance of composite materials, for example in fiber reinforced thermoplastic materials. Indeed, poor dispersion of fiber (fiber clumps) can reduce the advantage of fiber in a composite and may even weaken the composite compared to the fiber free material.

Prior to the discovery disclosed herein, that fiber is readily dispersed in an aqueous mixture using clay as a dispersant, it was thought that the uniform dispersal of fiber in an aqueous mixture required the use of compatibility agents see e.g., U.S. Pat. No. 4,717,742, and/or high shear mixing techniques see e.g., U.S. Pat. No. 6,379,446, or excess amounts of water see e.g., U.S. Pat. No. 5,897,701. Unfortunately, all the known methods for dispersing fiber in aqueous mixtures complicate the process of fiber dispersal and thereby increase the cost of fiber reinforced products.

Fortunately, the present inventors have discovered, and now herein disclose, a low cost method to disperse fiber in a clay/water mixture using conventional mixing equipment. When the methods disclosed herein are used for dispersing fiber in water, the fiber becomes substantially uniformly dispersed. This is a surprising and unexpected result since both clay and cellulose fiber have negative charges. Under these conditions repulsion at the microscopic level would normally be expected (see e.g., U.S. Pat. No. 6,379,446), thereby making dispersion difficult or impossible without compatibility agents. Thus, achieving good dispersion of fiber in clay and water was unexpectedly found to be readily achievable using the process disclosed herein, even with standard mixing equipment.

The well-dispersed fiber/clay mixtures are used as a basic matrix upon which to build various composite materials. Indeed, various cements, thermoplastics, fillers, binders and processing aids can be added to the clay/fiber/water mixture to make a wide variety of fiber reinforced composite products. In an exemplary embodiment, the well-dispersed fiber/clay mixtures are used with cement e.g., Portland cement or gypsum cement, to form a composite that makes a light weight building material. In another exemplary embodiment, fillers, binders, and processing aids are added to reduce costs, improve product performance and/or facilitate processing, respectively.

In another exemplary embodiment, the well-dispersed fiber/clay mixtures are used with thermoplastic materials to make thermoplastic products. In such exemplary embodiments, the thermoplastic material can participate as a binder, a matrix component, or both. Thermoplastic products made according to the disclosed methods have good mechanical properties, excellent moisture resistance and high temperature stability.

Thus, the methods disclosed herein relate to various fiber reinforced composite materials and methods for making fiber reinforced composite materials and products. Therefore, illustrative compounds and materials for the manufacture of fiber reinforced composites are set forth. Methods for making composite materials are also set forth, as well as some illustrative products that are made by the disclosed methods.

II. Overview of Components

Fiber reinforced composites comprise at minimum water, clay and substantially uniformly dispersed fibers. In some exemplary embodiments, cements, fillers, binders, mold release agents, and thermoplastics are added to the mixtures of clay/water/dispersed fiber to achieve the type of final product desired.

A. Fiber Types

The invention utilizes various fibers and fibrous substances. Fibers can be made of cellulosic or lignocellulosic materials, metals, ceramics, glasses, or polymers. In an exemplary embodiment the fiber used is a lignocellulosic fiber e.g., a softwood fiber.

1. Cellulosic and Lignocellulosic Fibers

In an exemplary embodiment the fiber is a cellulosic fiber e.g., a recycled cellulosic fiber e.g., recycled newsprint. In another exemplary embodiment the fiber is a lignocellulosic fiber e.g., a softwood fiber.

In general, cellulosics and lignocellulosics are classified into two categories, particulate and fibrous. Particulates have an aspect ratio (ratio of the length to diameter) of approximately unity. Typically, particulates confer no significant strengthening to the composite product, although the elastic modulus and some other properties may be improved. Wood flour, ground rice hulls, ground corncob, etc. are classified as particulate.

In general, the strengthening benefit to the composite due to the fibers depends on the stress transfer efficiency from the matrix to the fibers. The stress transfer efficiency varies according to the fiber length distribution present in the composite and the type of fiber-matrix interfacial interactions occurring. Typically, fibers are useful for producing fiber reinforced composites when the aspect ratios vary between that of the particulates (unity) and that of continuous fibers.

In an exemplary embodiment, reinforcing fibers, which can be obtained from any source, are greater than about 0.5 mm in length. In another exemplary embodiment, useful, reinforcing fibers are greater than about 0.6 mm in length. In other exemplary embodiments, useful reinforcing fibers are greater than about 0.7 mm in length, greater than about 0.8 mm in length, greater than about 0.9 mm in length, greater than about 1.0 mm in length, greater than about 1.1 mm in length, greater than about 1.2 mm in length, greater than about 1.3 mm in length, greater than about 1.4 mm in length, greater than about 1.5 mm in length, greater than about 1.6 mm in length, greater than about 1.7 mm in length, greater than about 1.8 mm in length, greater than about 1.9 mm in length, greater than about 2.0 mm in length, greater than about 2.1 mm in length, greater than about 2.2 mm in length, greater than about 2.3 mm in length, greater than about 2.4 mm in length, greater than about 2.5 mm in length, greater than about 2.6 mm in length, greater than about 3.0 mm in length, greater than about 4.0 mm in length, greater than about 5.0 mm in length, greater than about 6.0 mm in length, greater than about 7.0 mm in length, greater than about 8.0 mm in length, greater than about 9.0 mm in length, greater than about 10 mm in length, greater than about 11 mm in length, greater than about 12 mm in length, greater than about 13 mm in length, greater than about 14 mm in length, greater than about 15 mm in length, greater than about 16 mm in length, greater than about 17 mm in length, greater than about 18 mm in length, greater than about 19 mm in length, greater than about 20 mm in length, greater than about 21 mm in length, greater than about 22 mm in length, greater than about 23 mm in length, greater than about 24 mm in length, greater than about 25 mm in length, and/or greater than about 26 mm in length.

In another exemplary embodiment, reinforcing fibers have a diameter that is between about 10 µm to about 80 µm. In another exemplary embodiment, reinforcing fibers have a diameter that is between about 20 µm to about 50 µm. In other exemplary embodiments, reinforcing fibers have a diameter that is about 5 µm, about 10 µm, about 15 µm, about 20 µm, about 25 µm, about 30 µm, about 35 µm, about 40 µm, about 45 µm, about 50 µm, about 55 µm, about 60 µm, about 65 µm, about 70 µm, and/or about 75 µm.

In another exemplary embodiment, reinforcing fibers have an aspect ratio that is in a range of between about 10 to about 500. In another exemplary embodiment, reinforcing fibers have an aspect ratio that is in a range of between about 30 to about 100. In other exemplary embodiments, reinforcing fibers have an aspect ratio that is about 15, about 20, about 25, about 35, about 40, about 45, about 50, about 55, about 60, about 65, about 70, about 75, about 80, about 85, about 90, about 95, about 150, about 200, about 250, about 300, about 350, about 400, and/or about 450.

In exemplary embodiments, reinforcing fibers are obtained from lignocellulosic plant fibers such as softwood and hardwood. In one exemplary embodiment, useful reinforcing fibers are softwood fibers greater than about 0.5 mm in length. In another exemplary embodiment, useful reinforcing fibers are softwood fibers greater than about 0.6 mm in length. In other exemplary embodiments, useful reinforcing fibers are softwood fibers greater than about 0.7 mm in length, greater than about 0.8 mm in length, greater than about 0.9 mm in length, greater than about 1.0 mm in length, greater than about 1.1 mm in length greater than about 1.2 mm in length, greater than about 1.3 mm in length, greater than about 1.4 mm in length, greater than about 1.5 mm in length, greater than about 1.6 mm in length, greater than about 1.7 mm in length, greater than about 1.8 mm in length, greater than about 1.9 mm in length, greater than about 2.0 mm in length, greater than about 2.1 mm in length, greater than about 2.2 mm in length, greater than about 2.3 mm in length, greater than about 2.4 mm in length, greater than about 2.5 mm in length, and/or greater than about 2.6 mm in length.

In other exemplary embodiments, useful reinforcing fibers are obtained from different parts of the plant e.g., bast, seed or leaf fibers. In still other exemplary embodiments, fibers are obtained from cotton, jute, hemp or straw fiber. In another exemplary embodiment, useful reinforcing fibers are recycled fibers. In still another exemplary embodiment, useful reinforcing fibers are synthetic polymer fibers e.g., polyolefins.

In one exemplary embodiment, the reinforcing fiber is a pulped fiber. Plant pulp is derived from wood or non-wood plants through pulping processes which use mechanical, thermal and/or chemical means known in the art (see e.g., M. J. Kocurek and C. F. B. Stevens, "Pulp and Paper Manufacture—Vol. 1: Properties of Fibrous Raw Materials and Their Preparation for Pulping" The Joint Textbook Committee of the Paper Industry, 1983, 182 pp. which is incorporated herein by reference). Examples of plant pulp include kraft, sulfite, mechanical, thermomechanical, chemi-thermomechanical, and combinations thereof. Both non-wood and wood plants and plant parts may be used as the raw materials in the pulping process. However, pulped fiber is not limited to pulped wood fibers. For example, recycling of paper also yields the pulp originally used in the production of paper, and these recycled fibers are also used as reinforcing fibers for the production of composite products.

Softwood and hardwood trees are popularly used in the production of pulp. Softwood pulp fibers are typically from about 0.2 to 10 mm in length and from about 0.01 to 0.1 mm in diameter. However, softwood pulp fibers can be any length and/or any diameter. In an exemplary embodiment, softwood pulp fibers are about 0.3 mm in length. In another exemplary embodiment, softwood pulp fibers are about 0.4 mm in length. In other exemplary embodiments, softwood pulp fibers are about 0.5 mm in length, about 0.6 mm in length, about 0.7 mm in length, about 0.8 mm in length, and/or about 0.9 mm in length.

As noted above softwood pulp fibers are typically about 0.01 to 0.1 mm in diameter. In an exemplary embodiment, softwood pulp fibers are about 0.02 mm in diameter. In other exemplary embodiments, softwood pulp fibers are about 0.03 mm in diameter, about 0.04 mm in diameter, about 0.05 mm in diameter, about 0.06 mm in diameter, about 0.07 mm in diameter, about 0.08 mm in diameter, about 0.09 mm in diameter, and/or about 0.1 mm in diameter.

Hardwood pulp fibers are typically from about 0.5 mm to about 6 mm in length and from about 0.005 mm to 0.05 mm in diameter. However, hardwood pulp fibers can vary length and/or diameter. In an exemplary embodiment, hardwood pulp fibers are about 0.6 mm in length. In another exemplary embodiment, hardwood pulp fibers are about 0.7 mm in length. In other exemplary embodiments, hardwood pulp fibers are about 0.8 mm in length, about 0.9 mm in length, about 1.0 mm in length, about 2.0 mm in length, about 3.0 mm in length, about 4.0 mm in length, about 5.0 mm in length, and/or about 6.0 mm in length.

As noted above hardwood pulp fibers are typically about 0.005 mm to about 0.05 mm in diameter. In an exemplary embodiment, hardwood pulp fibers are about 0.006 mm in diameter. In other exemplary embodiments, hardwood pulp fibers are about 0.007 mm in diameter, about 0.008 mm in diameter, about 0.009 mm in diameter, about 0.01 mm in diameter, about 0.02 mm in diameter, about 0.03 mm in diameter, about 0.04 mm in diameter, and/or about 0.05 mm in diameter.

Typically plant pulp comprises cellulose, and may also comprise hemicellulose and lignin. Although the characteristics of pulp fibers vary within and between species, in general, the structure of pulp fiber is comprised of layers comprising fibrils wound in different inclinations; the fibrils themselves being assemblages of microfibrils.

Some pulping processes (e.g., chemical processes) remove some of the constituents of the plant fibers (e.g., lignin) to different extents. Bleaching of pulp further removes some of these constituents.

2. Synthetic Fibers

In an exemplary embodiment, polyolefins, e.g., polyethylene polypropylene, and nylon are used as reinforcing fibers in a fiber reinforced composite. In an exemplary embodiment, the synthetic fibers have a length that is in a range that is between about of 2 mm to about 15 mm. In another exemplary embodiment, synthetic fibers have a length that is in a range that is between about 5 mm to about 10 mm in length. In other exemplary embodiments, synthetic fibers have a length that is about 4 mm, about 6 mm, about 7 mm, about 8 mm, about 9 mm, about 10 mm, about 11 mm, about 12 mm, about 13 mm, about 14 mm, about 15 mm, about 16 mm, about 17 mm, about 18 mm, about 19 mm, about 20 mm, about 21 mm, about 22 mm, about 23 mm, about 24 mm, about 25 mm, and/or about 26 mm. Indeed in an exemplary embodiment, synthetic fibers have a length that is any length up to and/or including about 26 mm.

B. Clay

Clay is a generic term for an aggregate of hydrous silicate particles less than about 2 μm (micrometers) in diameter. As noted above, clay refers to any aluminum silicate based material. Typically clay comprises of a variety of phyllosilicate minerals rich in silicon and aluminium oxides and hydroxides with variable amounts of structural water. Typically clays are formed by the chemical weathering of silicate-bearing rocks by carbonic acid. However, some clays are formed by hydrothermal activity. In general, clays can be distinguished from other small particles present in soils e.g., silt, by their small size, flake or layered shape, affinity for water and high plasticity index.

The three main groups of clays are kaolinite-serpentine, illite, and smectite. There are about thirty different types of "pure" clays in these categories, but most "natural" clays are mixtures of these different types, as well as other weathered minerals.

Montmorillonite, with a chemical formula of $(Na,Ca)_{0.33}(Al,Mg)_2Si_4O_{10}(OH)_2 \cdot nH_2O$, is typically formed as a weathering product of low silica rocks. Montmorillonite is a member of the smectite group and a major component of bentonite. Bentonite is an absorbent aluminium phyllosilicate comprised largely of montmorillonite. Two types bentonite exist: swelling bentonite which is also called sodium bentonite and non-swelling bentonite or calcium bentonite.

In an exemplary embodiment, sodium bentonite clay is used to disperse fiber in an aqueous mixture. Sodium bentonite clay is particularly efficient in dispersing fiber. Indeed, sodium bentonite clay is an effective fiber dispersant that is effective at less than a one to one bentonite to fiber weight ratio. However, the clay is, of course, also effective at higher and/or lower bentonite to fiber ratios e.g., in a range that is between about 0.02:1 to about 2:1. Other clays such as kaolin, montmorillonite, fuller's earth, calcium bentontite and attapulgite clay can also be used to disperse fiber, but are generally not as efficient as sodium bentonite clay, and thus more clay is typically used to disperse a given amount of fiber.

C. Water

The invention utilizes sufficient water to both hydrate the fiber and to gel the clay. Methods for determining whether sufficient hydration has been achieved are known in the art (see e.g., co-pending U.S. patent application Ser. No. 11/184,128, filed Jul. 19, 2005, which is incorporated herein by reference). In an exemplary embodiment hydration is determined by complete wetting of the fiber and uptake of water into the lumen of the fiber. When hydrated, the fiber mats readily fall apart, even with mild mixing.

Typically the amount of water needed is in a range of about 7-15 times as much water as clay, but the exact ratio depends on the type of clay, the nature of the fiber, and the ratio of fiber to clay. In an exemplary embodiment, the amount of water needed is about 8 times as much water as clay. In another exemplary embodiment the amount of water needed is about 9 times as much water as clay. In other exemplary embodiments the amount of water needed is about 10 times, about 11 times, about 12 times, about 13 times, and/or about 14 times as much water as clay. Insufficient water makes fiber dispersion difficult or even unsuccessful. Very high water levels make a thin gel or slurry, also making the fiber dispersion inefficient or unsuccessful.

D. Binders, Fillers and Processing Aids

In one aspect the invention provides binders, fillers, and/or processing aids that are added to the fiber/clay water mixture. Indeed, the methods disclosed herein are quite flexible with respect to variety and amount of additives e.g., cement, thermoplastics, fillers, binder, and processing aids that can be accommodated into the basic fiber/clay/water mixture. This aspect ensures that a wide array of products can be made according to the methods disclosed herein.

Furthermore, binders, fillers and processing aids can be added either before or after the fiber dispersal step. In an exemplary embodiment, the fillers and/or binders are added to the basic fiber/clay/water mixture before the fiber dispersion e.g., before addition of the clay dispersant. In another exemplary embodiment, the fillers and/or binders are added to the basic fiber/clay/water mixture after the fiber dispersion e.g., after or together with the addition of the clay dispersant. This extends the utility of the invention enormously.

In an exemplary embodiment a binder is added to the fiber/clay/water mixture to minimize and/or prevent fiber clumping and separation. Although the bentonite clay disperses fiber very well and very reliably, there is not a strong inherent affinity between the clay and the fiber. High shear processing of the mix can form small fiber clumps, reversing some of the fiber dispersion. Additionally, it is sometimes the case that, when the clay/fiber mix is dried, some clay becomes dislodged from the matrix during processing. If a substantial quantity of clay is dislodged, fiber clumps will form. Binders e.g., low melting thermoplastic polymers, act like glues that hold the clay and fiber together in the matrix. They increase the mechanical strength of the dried clay/fiber composite.

In an exemplary embodiment, a low melting thermoplastic polymer e.g., Polybutyleneadipate/terphthalate copolymer (Ecoflex, which is biodegradable) and/or polyethylene is added to the clay/fiber mix before drying to act as a binder. In this embodiment, the thermoplastic polymer is introduced as either a powder or a small granule (typically less than 1 mm). The thermoplastic melts during the drying process and acts as a binder. This embodiment provides a pliable binder that is effective in keeping the fiber dispersed during processing.

Other exemplary binders include, but are not limited to cellulose ethers, lignosulfonate, polyvinylalcohol, sugar, oligosaccharide or polysaccharide solutions. Cellulose ethers include carboxymethylcellulose, hydroxypropylcellulose, hydroxyethylcellulose, and methylcellulose. In an exemplary embodiment, cellulose ethers are prepared as aqueous solutions and added to the clay/fiber mix. Lignosulfonates are either sodium or calcium salts or mixtures thereof. In an exemplary embodiment, lignosufonates are added as an aqueous solution. In another exemplary embodiment, lignosufonates are added as a solid. Sugar solutions, such as corn syrup, oligosaccharide, or polysaccharide solutions can also serve as binders that are added to the clay/fiber matrix. In another exemplary embodiment the binder is a thermoplastic binder.

In an exemplary embodiment, binders are used at a binder to clay ratio that is in a range of between about 0.01:1 to about 0.2:1. In another exemplary embodiment, binders are used at a binder to clay ratio that is about 0.02:1. In other exemplary embodiments, binders are used at a binder to clay ratio that is about 0.03:1, about 0.04:1, about 0.05:1, about 0.06:1, about 0.07:1, about 0.08:1, about 0.09:1, about 0.1:1, about 0.11:1, about 0.12:1, about 0.13:1, about 0.14:1, about 0.15:1, about 0.16:1, about 0.17:1, about 0.18:1, and/or about 0.19:1.

In other exemplary embodiments, fillers can be added to the fiber/water/clay mix. In exemplary embodiments, fillers reduce the cost of the composite material or modify the product density or properties. Exemplary fillers include, but are not limited to e.g., sand, ground limestone, talc, gypsum and/or starch. In an exemplary embodiment, the filler is present in a filler to clay ratio that is in a range that is between about 0.1:1 to about 7:1. In other exemplary embodiments, fillers are used at a filler to clay ratio that is about 0.1:1, about 0.2:1, about 0.3:1, about 0.4:1, about 0.5:1, about 0.6:1, about 0.7:1, about 0.8:1, about 0.9:1, about 1:1, about 2:1, about 3:1, about 4:1, about 5:1, and/or about 6:1.

In general, fillers are used to reduce the cost of making a fiber reinforced product. Thus, in some embodiments, one uses as much filler as possible without compromising the desired properties of a particular fiber reinforced composite product. Typically, one of skill in the art will be able to determine when too much filler is added to the mixture.

In other exemplary embodiments processing aids e.g., mold release agents e.g., erucamide are added to the mixture. In exemplary embodiments, mold release agents are used at concentrations that are in a range of between about 0.01% up to and including about 5%. In other exemplary embodiments, mold release agents are used at concentrations that are about 0.02%, about 0.03%, about 0.04%, about 0.05%, about 0.06%, about 0.07%, about 0.08%, about 0.09%, about 1.0%, about 2.0%, about 3.0%, and or about 4.0%.

In an exemplary embodiment, a combination of fillers, binder and/or processing aids is used in preparing dispersed fiber/clay composites. Depending on the application, the appropriate combinations can reduce product costs, e.g., adding sand as a filler can reduce the costs of producing building materials, improve mechanical properties, modify product density, and aid processing e.g., adding erucamide facilitates the mold release of fiber reinforced thermoplastics.

In an exemplary embodiment, the fiber/clay mixture is dried to remove water before further processing. In another exemplary embodiment, the fiber/clay mixture, with the various additives e.g., binders and/or fillers, is dried to remove water before further processing. In one exemplary embodiment, samples are dried at 80° C. However since the components of the clay/fiber mix have good temperature stability, any convenient drying conditions that serve to remove water are suitable. For example, in exemplary embodiments, drying is done at about 0° C., at about 10° C., at about 15° C., at about 20° C., at about 25° C., at about 30° C., at about 35° C., at about 40° C., at about 45° C., at about 50° C., at about 55° C., at about 60° C., at about 65° C., at about 70° C., at about 75° C., at about 85° C., at about 90° C., at about 95° C., at about 100° C., at about 105° C., at about 110° C., at about 115° C., at about 120° C., at about 125° C., at about 150° C., and/or at about 200° C., that is at any convenient drying temperature. In an exemplary embodiment, drying is done to create fiber-rich sheets or fiber-rich pellets for further processing. The resulting pellets and sheets have good storage stability. Therefore, in an exemplary embodiment, dried fiber sheets and/or pellets are isolated and stored for use on later processing applications.

III. Fiber Dispersal

The arrangement or orientation of the fibers relative to one another, the fiber concentration, and the distribution of fibers in the matrix material all influence the strength and other properties of fiber-reinforced composites. Applications involving totally multidirectional applied stresses normally use discontinuous fibers, which are randomly oriented in the matrix material.

In every case however, the more uniformly distributed the fiber is in the matrix, the better the quality of the final fiber reinforced composite product. Therefore, in one aspect, the invention provides methods for substantially uniformly dispersing fiber in an aqueous mixture.

A. Method and Equipment for Dispersing Fiber in Clay

1. Dispersing Cellulosic Fibers

As noted above, in one aspect, the invention provides methods for substantially uniformly dispersing fiber in and aqueous mixture. In an exemplary embodiment, a dispersed fiber matrix comprises clay, fiber and water. To produce the clay/fiber/water matrix, fiber is first fully hydrated with excess water, and then broken up with mixing. Clay is added thereby forming a clay/fiber/water gel comprising substantially uniformly dispersed fiber. In an exemplary embodiment, the fiber is a cellulosic fiber.

In another exemplary embodiment, the fiber is a dry cellulosic fiber. With dry fiber, e.g., sheets, or pulp fiber, the fiber is soaked in water to ensure complete hydration. Typically, excess water is used, and only a few minutes of soaking are required to fully hydrate the fiber.

In another exemplary embodiment, the fiber is a wet cellulosic fiber. In one exemplary embodiment, a premoistened fiber e.g., wet lap, is used. In this embodiment, the amount water is adjusted to account for the water content of the fiber. A fully hydrated fiber mixture can be identified by complete wetting of the fiber. At this point, the fiber mat readily falls apart, even with mild mixing.

Once hydration is achieved, the wet fiber is comminuted to a size of at least about $\frac{1}{8}$" or less. In one embodiment, the wet fiber is comminuted to a size of at least about $\frac{1}{16}$". In another embodiment, the wet fiber is comminuted to a size of at least about $\frac{1}{32}$". Comminuting is complete when the mixture appears to take on a hamburger-like consistency. In an exemplary embodiment, the mixing and comminuting takes place in a variable speed mixer, e.g., a Hobart mixer, at speeds that ensure low shear forces on the fiber/water mixture e.g., at speeds of about 20-30 rpm in a small Hobart mixer. The operation takes only a few minutes. Any mixing equipment that provides relatively low shear will be suitable. High shear mixing operations are not recommended because the fibers will be damaged and fiber length reduced.

In an exemplary embodiment, the next step is to add the clay, e.g., sodium bentonite clay, to the mixture in the mixer. In all embodiments, the amount of clay added to the mix depends on the amount of water in the water/hydrated fiber mixture. If the mixture is too dry, fiber dispersion will not be complete. If too much water is used, the mixture will be thin and the clay gel not efficient in dispersing the fiber. A person of skill in the art having available to them the knowledge in the art and the information provided herein, will be able to assess whether there is too little, or too much water. Typically, the ratio of water to sodium bentonite clay is in a range from between about 4:1 to about 15:1. In an exemplary embodiment, the ratio of water to sodium bentonite clay is in a range from between about 7:1 to about 11:1. However, in some exemplary embodiments, the ratio of water to sodium bentonite clay is about 5:1, about 6:1, about 8:1, about 9:1, about 10:1, about 12:1, about 13:1, and/or about 14:1. As the clay wets, it forms a gel. This gel is instrumental in dispersing the fiber.

The clay/water/and fiber are mixed for between about 5-20 minutes at medium to high speed with e.g., a Hobart mixer. However, the mixing time is not critical. Indeed, mixing is complete when the mix is homogeneous and the fiber is well-dispersed. In an exemplary embodiment, fiber dispersion is readily checked by placing a small dollop of the mix between two plates of Plexiglas and squeezing gently. The fiber is well-dispersed if no fiber clumps are visible. Of course, any method known in the art for measuring fiber dispersal is suitable for measuring fiber dispersal and is therefore encompassed by the methods disclosed herein (see e.g., *Fiber Reinforced Composites: Materials Manufacturing and Design*; P. K. Mallick (1993) Marcel Decker, Inc. 584 pp. which is incorporated herein by reference). If fiber clumps are observed when fiber dispersal is checked, additional mixing will disperse them.

Another variable of the fiber dispersion processes disclosed herein is the ratio of dry fiber to clay. In exemplary embodiments, the clay/fiber mixtures have fiber contents well above 50% on a dry basis. Indeed in some exemplary embodiments, the clay/fiber mixtures have fiber contents that are about 50% on a dry basis, about 55% on a dry basis, about 60% on a dry basis, and/or about 65% on a dry basis. In other exemplary embodiments, lower fiber concentrations are also used. For example, in some exemplary embodiments the clay/fiber mixtures have fiber contents that are about 45% on a dry basis, about 40% on a dry basis, about 35% on a dry basis, about 30% on a dry basis, about 25% on a dry basis, about 20% on a dry basis, about 15% on a dry basis, about 10% on a dry basis, and/or about 5% on a dry basis.

Thus, for sodium bentonite clay, typically, the ratio of dry fiber to clay is in a range of between about 0.2:1 to about 2:1. In an exemplary embodiment, the ratio of dry fiber to clay is in a range of between about 1:1 to about 1.5:1. In other exemplary embodiments, the ratio of dry fiber to clay is about 0.3:1, about 0.4:1, about 0.5:1, about 0.6:1, about 0.7:1, about 0.8:1, about 0.9:1, about 1.0:1, about 1.1:1, about 1.2:1, about 1.3:1, about 1.4:1, about 1.5:1, about 1.6:1, about 1.7:1, about 1.8:1, and/or about 1.9:1. If insufficient clay is used, typically a fiber to sodium bentonite clay ratio of greater than about 2:1, it will be difficult or impossible to disperse the fiber completely.

Sodium bentonite clays form a strong gel and are efficient in dispersing fiber. However, other clays such as kaolin, montmorillonite, fuller's earth, calcium bentonite or attapulgite clay are also suitable for use in the fiber dispersion process. Typically, in these embodiments, lower fiber/clay ratios are employed. In an exemplary embodiment, kaolin clay is used in a fiber/clay ratio of 0.2:1 to disperse the fiber.

2. Dispersing Synthetic Fibers

The process is adapted slightly in those embodiments where synthetic polymer fibers are used in place of cellulosic fibers. In an exemplary embodiment employing synthetic fibers, the fiber hydration step is not conducted, and less water is used to disperse the fiber. In an exemplary embodiment, synthetic fibers are dispersed in a mixture comprising water and clay in a water to bentonite clay ratio of between about 3:1 to about 7:1. In other exemplary embodiments, synthetic fibers are dispersed in a mixture comprising water and clay in a water to bentonite clay ratio of about 4:1, about 5:1, and/or about 6:1. The fiber dispersion process is similar to that used for cellulose fiber.

IV. Dispersed Fiber Reinforced Products

Fiber reinforced thermoplastic composites made according to the methods disclosed herein have good water resistance and heat resistance during processing compared to fiber reinforced thermoplastic composites made by other methods known in the art e.g., fiber reinforced thermoplastic composites made using starch fiber dispersal methods. Similarly, fiber reinforced cement products are stronger and more reliable than fiber reinforced cement composites made by other methods known in the art e.g., fiber reinforced cement composites made using starch fiber dispersal methods, since the clays are more stable in the high alkaline environment than are starches. Some exemplary fiber reinforced composites made according to the methods disclosed herein are discussed below.

A. Plastic and Thermoplastic Products

Factors that affect the properties of a composite product, including a thermoplastic composite product, include, but are not limited to fiber dispersion, fiber length distribution and fiber orientation. It is of great importance that fibers are dispersed substantially uniformly in a plastic. Clumping and agglomeration must be avoided to produce efficient composites. Limiting the degree of clumping is often difficult using conventional technologies due to the hydrophilic nature of the fibers and the vastly different non-polar plastics such as polyethylene and polypropylene. Furthermore, high shear mixing techniques required to disperse fiber with conventional technology, also tend to shear the fibers, reducing their overall length.

Fortunately however, in one aspect, the invention provides methods for making thermoplastic composite materials comprising substantially uniformly dispersed fiber. The resultant thermoplastic composites are water resistant, unlike e.g., other starch/thermoplastic blends which are known in the art (see e.g., J. of Polymers and the Environment 13(1): S. H. Imam et al. (2005): 47-55 which is incorporated herein by reference) the clay/fiber/thermoplastic composites also have excellent thermal stability that is useful for high temperature processing such as extruding, thermoforming and injection molding. Indeed, thermoplastic composites made according to the methods disclosed herein have good water resistance and heat resistance during processing compared to e.g., starch fiber dispersal methods.

In an exemplary embodiment, dried dispersed fiber/clay pellets or sheets as described above, are combined with various thermoplastic resins in a twin-screw extruder to make a composite product. Twin screw extruders are known in the art (see e.g., J. L. White, *Twin Screw Extrusion: Technology and Principles*, Hanser Publishers, New York (1991) which is incorporated herein by reference). Twin screw extrusion is used extensively for mixing, compounding, or reacting polymeric materials. The flexibility of twin screw extrusion equipment allows this operation to be designed specifically for the formulation being processed. In an exemplary embodiment, extruder temperatures are 200° C. or less. In other exemplary embodiments, extruder temperatures are 195° C. or less, 190° C. or less, 185° C. or less, 180° C. or less, 175° C. or less, 170° C. or less, 165° C. or less, 160° C. or less 150° C. or less, 155° C. or less, 150° C. or less, 145° C. or less, 140° C. or less, 135° C. or less, 130° C. or less, 125° C. or less, and/or 120° C. or less. In general, extruder temperatures are adjusted to about the melting point of the thermoplastic plus between about 10° C.—to about 20° C. margin for processing. In an exemplary embodiment, a relatively low melting polymer such as polyethylene, is extruded at a temperature that is in a range of between about 120° C. to about 130° C.

In another exemplary embodiment, the ratio of thermoplastic resins to fiber pellets is about 1:1 or higher depending on the target level of fiber in the composite. In another exemplary embodiment, the ratio of thermoplastic polymer to fiber pellets is in a range that is between about 2:1 to about 6:1. In other exemplary embodiment the ratio of thermoplastic polymer to fiber pellets is about 3:1, about 4:1, and/or about 5:1.

In another exemplary embodiment, the dried fiber/clay pellets are combined with a biodegradable thermoplastic polymer. In recent years considerable interest has arisen in biodegradable thermoplastics, since such materials have the potential to help solve the problems associated with municipal solid waste; litter and landfill disposal. Unfortunately, the cost of manufacturing biodegradable thermoplastics is often prohibitive. Thus, the necessary low-cost nature of disposable products requires both a cost efficient processing system and inexpensive raw materials. Melt-processing e.g., extrusion and injection molding, injection molding is known in the art (see e.g., Injection Molding Handbook $3^{rd}$ ed (2000) Rosato, Domonik, V. et al. eds Springer-Verlag which is incorporated herein by reference) of thermoplastic biodegradable polymers that are highly loaded (with cheap biodegradable fillers) affords both an inexpensive process and materials' cost-savings without sacrificing biodegradability. Therefore, in an exemplary embodiment, the invention provides methods for making thermoplastic composite materials comprising dispersed fiber and a biodegradable thermoplastic polymer e.g., polylactic acid, polybutyleneadiapate/terephthalate copolymers (Ecoflex), ethylene vinyl alcohol copolymers, and/or polyhydroxybutyrate/valerate.

When the methods disclosed herein are practiced using biodegradable thermoplastics, the composite material is fully biodegradable. The fiber accelerates the rate of degradation under composting conditions by providing better moisture access to the matrix via wicking action of the fibers. Injection molding can produce fully compostable parts with completely dispersed fibers.

In another exemplary embodiment, the invention provides methods for making thermoplastic composite materials comprising dispersed fiber and a non-biodegradable thermoplastic polymer e.g., polyethylene and polypropylene.

In exemplary embodiments, adding fillers e.g., limestone and/or talc, to thermoplastic composites reduces material costs. In some exemplary embodiments, composite products comprising fillers have mechanical properties that are similar to the mechanical properties of products made comprising the pure polymer or polymer blend.

In an exemplary embodiment, a low melting thermoplastic polymer e.g., Polybutyleneadipate/terphthalate copolymer (Ecoflex) and/or polyethylene is added to the clay/fiber mix before drying to act as a binder. Mixing is best if the thermoplastic polymer is introduced as either a powder or a small granule (typically less than 1 mm). The thermoplastic melts during the drying process and acts as a binder. This embodiment provides a pliable binder that is effective in keeping the fiber dispersed during processing.

In an exemplary embodiment, the mixture of fiber/clay/additives/low melting thermoplastic polymer can be rolled into sheets before drying. In an exemplary embodiment, the dried sheets are used in thermoforming processes. If the sheets are thermoformed at temperatures at or above the melting point of the thermoplastic polymer, then thermoformed parts can be made with the flexible fiber containing sheet. Thermoforming can be used to produce a wide variety of target shapes e.g., spheres, boxes, circles, cups, containers, pyramids, etc, that is any convenient or desirable shape.

Thus, in an exemplary embodiment, the addition of cellulosic fibers to a thermoplastic matrix synergistically enhances the strength of the composite.

Any fiber reinforced thermoplastic product can be made by the methods disclosed herein. Some exemplary products include, but are not limited to body panels of cars, bottle caps and/or outdoor furniture.

B. Building Materials

The concept of using fibers to improve the behavior of building materials is old. For example ancient people used straw fibers to fortify sun-dried mud bricks (adobe). Thus, when modern Portland cement concrete started evolving as a building material, it is no surprise that people attempted to add fibers to it to improve its behavior. Early work in this area in the 19th century led to the development of ferrocement and reinforced concrete as known today.

Unfortunately, the idea of using strong discontinuous fibers as reinforcement for concrete has been a challenge to many civil engineers. Indeed, the ability to add fibers simply, like adding aggregates or admixtures, was, until the advent of this invention, merely an unrealized dream that started more than a century ago.

Unfortunately, conventional mixing of concrete in e.g., ready-mixed concrete trucks, central mixers and different forms of rotary drum, pan, continuous and mortar mixers (P. K. Mehta and P. J. M. Monterio, *Concrete Structure, Properties, and Materials*, Prentice Hall, 1983, 548 pp. which is incorporated herein by reference) lacks the intensity and the amount of water needed to effectively separate and disperse plant pulp, and other fibers. Consequently, if the fiber is added to concrete, current technology does little to cause dispersal of the fiber. Instead, the fiber, especially plant pulp fiber, tends to be coated with the wet cement paste but does not break down into individual fibers which can be uniformly dispersed in the fresh concrete mix.

Fortunately however, the present inventors have now discovered a method by which both cellulosic and synthetic fibers can be efficiently and cost effectively dispersed in an aqueous mixture. The method efficiently disperses the fiber into individual fibers, not strips, mats, sheets or clumps, and disperses the fiber without retention aids, high shear mixing techniques, and/or excessive amounts of water which subsequently require that the product be dewatered (see e.g., U.S. Pat. No. 4,031,285; U.S. Pat. No. 4,351,867; U.S. Pat. No. 4,876,151; and U.S. Pat. No. 4,985,119). The resulting mixture comprising the dispersed individual fibers can then be used to create fiber reinforced building materials. The method comprises combining a mass of fiber with water; mixing the combined fiber and water to break up the mass of fiber and thereby form a mixture; adding clay to the mixture; and mixing thoroughly to produce a dispersed fiber/clay matrix comprising individually dispersed fibers.

U.S. Pat. No. 6,379,446 to Anderson et al., discloses that gelatinized starch is sometimes used to disperse fiber. However, gelatinized starch it is not compatible with the high alkalinity of cement and therefore causes problems such as e.g., weakness and short half life. Using clay as a dispersing agent for fiber as disclosed herein, overcomes the limitations of starch and starch based dispersants.

In general, fiber is used with cementitious materials to improve strength, reduce cracking or spalling, reduce density and improve tensile strength (see e.g., *Concrete*, S. Mindess and J. F. Young, Prentice-Hall, Inc. Englewood Cliffs, N.J. (1981), pages 628-645 which is incorporated herein by reference).

The choice of fibers varies from synthetic organic materials such as polypropylene or carbon, to synthetic inorganic such as steel or glass, to natural organic fibers such as cellulose or sisal and/or natural inorganic asbestos. Currently, commercial building products are typically reinforced with steel, glass, polyester and polypropylene fibers. Among the properties that guide the selection of fibers are e.g., length, diameter, specific gravity, young's modulus, tensile strength and the extent to which these different fibers affect the properties of the cement matrix (see e.g., Daniel J. I. et al. (1998) *Fiber Reinforced Concrete*, Portland Cement Association, which is incorporated herein by reference).

Among the different types of fibers used in cement based composites, cellulose fibers offer distinct advantages. Indeed, cellulose fibers are readily available, are renewable, and can be obtained at low cost.

As is well known, many building materials are based on cementitious materials. Therefore, in an exemplary embodiment, the fiber reinforced building material is based on cement. In another exemplary embodiment, the fiber reinforced building material is based on Portland cement. In other exemplary embodiments, the cementitious materials include any inorganic binder material which is cementitious in nature e.g., gypsum cement including, but not limited to foams e.g., beta and alpha gypsum; Portland cement including but not limited to any of the Types I-V; magnesium oxysulfate cement, magnesium oxychloride cement, zinc oxysulfate cement, zinc oxychloride cement, magnesium oxyphosphate cement, zinc oxyphosphate cement, alumnite cement, metal silicates e.g., calcium silicate and aluminum silicate, pozzolanic cements, and/or colloidal silicic acid.

Preparing Cement/Fiber Mixtures

In an exemplary embodiment, fiber is dispersed in clay and water using the methods disclosed herein. As disclosed above in Section III, Fiber Dispersal, fiber and clay are typically present in a dry fiber to clay ratio that is in a range between about 0.1:1 to about 2:1, and water and clay are present in a water to clay ratio that is in a range between about 2:1 to about 15:1.

Cement is then added to the dispersed fiber/clay/water and mixed. The ratio of water to total solids e.g., cement plus clay, is evaluated in the same way that water to total solids is evaluated when mixing cement that is not fiber reinforced according to the methods disclosed herein. Strong, durable concrete is comprised of ingredients that are carefully proportioned and mixed. For example, a concrete mixture that does not have enough paste to fill all the voids between the aggregates will be difficult to place and will produce rough, honeycombed surfaces and porous concrete. On the other hand, a mixture with an excess of cement paste will be easy to place and will produce a smooth surface; however, the resulting concrete is likely to shrink more and be uneconomical. As is known in the art (see e.g., *Concrete*, Mindess and Young, supra), an exemplary properly designed concrete mixture comprising Portland cement will possess the desired workability for the fresh concrete and the required durability and strength for the hardened concrete. Typically, such an exemplary properly designed concrete mixture comprises a mix that is about 10 to about 15 percent cement, about 60 to about 75 percent aggregate additives, fillers, and fiber, and about 15 percent to about 20 percent water. In exemplary embodiments, entrained air also takes up another 5 to 8 percent.

Therefore in one exemplary embodiment, the building materials comprise Portland cement, and the ratio of water to clay plus Portland cement in a mixture for the preparation of fiber reinforced building material is in a range that is between about 0.25:1 to about 2:1. In another exemplary embodiment, the ratio of water to clay plus Portland cement is about 1.5:1. In other exemplary embodiments, the ratio of water to clay plus Portland cement is about 0.3:1, about 0.4:1, about 0.6:1, about 0.7:1, about 0.8:1, about 0.9:1, about 1.0:1, about 1.1:1, about 1.2:1, about 1.3:1, about 1.4:1, about 1.6:1, about 1.7:1, about 1.8:1, and/or about 1.9:1.

In one exemplary embodiment, the fiber reinforced building materials comprise magnesium oxide cement. In another exemplary embodiment, the ratio of water to clay plus magnesium oxide cement in a mixture for the preparation of fiber reinforced building material is in a range that is between about 0.25:1 to about 2:1. In another exemplary embodiment, the ratio of water to clay plus magnesium oxide cement is in a range that is between about 0.5:1 to about 0.75:1. In other exemplary embodiments, the ratio of water to clay plus magnesium oxide cement is about 0.4:1, about 0.6:1, about 0.7:1, about 0.8:1, about 0.9:1, about 1.0:1, about 1.1:1, about 1.2:1, about 1.3:1, about 1.4:1, about 1.5:1, about 1.6:1, about 1.7:1, about 1.8:1, and/or about 1.9:1.

In another exemplary embodiment the fiber reinforced building material comprises Gypsum cement. In another exemplary embodiment, the ratio of water to clay plus gypsum cement in a mixture for the preparation of fiber reinforced building material is in a range that is between about 0.75:1 to about 3:1. In another exemplary embodiment, the ratio of water to clay plus gypsum cement is in a range that is between about 1:1 to 2:1. In other exemplary embodiments, the ratio of water to clay plus gypsum cement is about 1:1, about 1.25:1, about 1.5:1, about 1.75:1, about 2.25:1, about 2.5:1, and/or about 2.75:1.

In some exemplary embodiments the fiber/clay/water/cement mixture is also combined with fillers e.g., perlite, and/or binders e.g., a lignosulfate and/or a polysaccharide.

Additives Aggregates and Admixtures

In other exemplary embodiments, the fiber/clay/water/cement mixtures are combined with concrete fillers such as aggregate, sand, ash, was and/or perlite.

In exemplary embodiments the fiber reinforced concrete mixture comprises aggregates along with water and cement. Aggregates typically are inert granular materials e.g., sand, gravel, and/or crushed stone.

Aggregates typically are divided into two distinct categories: fine and coarse. Fine aggregates typically comprise natural sand and/or crushed stone with most particles passing through about a ⅜-inch (9.5-mm) sieve. Coarse aggregates are typically particles greater than about 0.19 inch (4.75 mm), but generally range between about ⅜ to about 1:5 inches (9.5 mm to 37.5 mm) in diameter. In some embodiments, gravels constitute the majority of coarse aggregate used in concrete. In some exemplary embodiments, aggregates, comprise about 60 to about 75 percent of the total volume of concrete.

In other exemplary embodiments, the fiber reinforced concrete mixture comprises chemical admixtures. Chemical admixtures are some of the ingredients in concrete other than cement, water, fiber, fillers, binders, and aggregate that can optionally be added to the mix immediately before or during mixing. In an exemplary embodiment, supplementary cementing materials, also called mineral admixtures, contribute to the properties of hardened concrete through hydraulic or pozzolanic activity. Typical examples are natural pozzolans, fly ash, ground granulated blast-furnace slag, and/or silica fume, which can be used individually with portland or blended cement or in different combinations. In an exemplary embodiment chemical admixtures are added to concrete to make concrete mixtures more economical, reduce permeability, increase strength, or influence other concrete properties.

Low Density Building Materials

In one exemplary embodiment, dispersed fiber/clay mixture is used in the preparation of low density building materials. The lower density of the fiber reduces the overall density of these building materials. In an exemplary embodiment, low density concrete is used in applications where low weight or low thermal conductivity is desired (see e.g., *Concrete*, S. Mindess and J. F. Young (1981), supra). Compressive strengths are generally lower with low density concretes.

In an exemplary embodiment, low density building materials comprise lignocellulosic fibers. Whole lignocellulose fibers comprise of bundles of individual cellulose fiber embedded in a lignin matrix. Unfortunately lignins tend to solubilize in alkaline conditions, making the fiber bundles unstable in alkaline cementitious binders. Therefore, in an exemplary embodiment, cellulose fibers are chemically pulped to remove lignin and the pulped fibers are used in the preparation of fiber reinforced concrete building materials. The methods disclosed herein are ideally suited for achieving substantially uniform dispersal of pulped fiber for use in the preparation of fiber reinforced low density building materials.

As noted above, current technologies for fiber dispersal do little to substantially uniformly disperse pulped cellulose fibers. Indeed, pulped cellulose fiber tends to clump and disperse poorly in cement mixtures. Fortunately, using the methods disclosed herein dispersed pulped cellulose fiber is readily mixed with cements to form a cellulose fiber reinforced concrete containing very well dispersed fiber.

C. Kitty Litter

For today's cat owners, cat litter is as much a necessity as cat food. The original kitty litters and still some of today's kitty litters comprise granulated Fuller's earth as the odor absorbing ingredient. Fuller's earth is a term for a chemically diverse set of absorbent clay minerals capable of absorbing their weight in water. Although Fuller's earth litters naturally provide odor control by sequestering urine, they are dusty and have to be changed frequently.

In the 1980's kitty litter formulations comprising bentonite clay were developed. Bentonite clay clumps up in the presence of moisture, allowing waste to be isolated and scooped out, leaving behind clean litter, and thus requiring less frequent cleaning. Today, approximately 60% of the cat litter sold in the U.S. is of the clumping variety, and most of it is made from bentonite clay. However, even clumping kitty litter is dusty, and so there is still room for more improvements in formulation. Fortunately in one aspect the invention provides improved kitty litter and methods for making such improved kitty litter.

Ideally, kitty litter should exhibit excellent clumping properties when exposed to water, should absorb odors and also should be lightweight and low dusting. Therefore, in an exemplary embodiment, the dispersed fiber/clay mixture disclosed herein is used for making low density, lightweight, low dusting kitty litter that is highly absorbent.

The inclusion of well-dispersed individual fibers in kitty litter improves the strength, the ability to absorb moisture, and improves the resistance to dusting of the resultant kitty litter. The fiber also helps to reduce product density and increase water/urine penetration.

In an exemplary embodiment, a low density kitty litter comprises water, clay and fiber. In one exemplary embodiment, water, clay and fiber are present in a water to clay ratio that is about 6:1 and a fiber/clay ratio that is about 1:1.

In exemplary embodiments, additives e.g., including, but not limited to baking soda, fragrances and antibacterial agents are added to the clay fiber/water mixture to produce a kitty litter having an improved ability to reduce smells and odor. In other exemplary embodiments, fillers e.g, perlite, and/or binders are added.

The mixture is dried and pelletized or is granulated. The resulting kitty litter has low density, good mechanical strength, and low dusting.

D. Paperboard Products

Paper and paperboard products include items such as food packaging, e.g., paper cups, "to go" packaging, paper plates; cardboard boxes, insulation, gypsum wallboard, envelopes and fertilizer bags, to name a very few.

In one aspect the invention provides paperboard products and methods for making them. In one embodiment, the dispersed fiber/clay/water mixture is flattened and dried to make paperboard products. In another exemplary embodiment, binders are added to the fiber/water/clay mixture as disclosed herein, to improve the mechanical strength of the clay/fiber paperboard products.

The following examples are offered to illustrate, but not to limit the invention.

EXAMPLES

Example 1

The following Example illustrates an exemplary method for making a basic fiber dispersed composite matrix using wood fiber, sodium bentonite clay and water to produce a mixture comprising well-dispersed fiber.

The following materials were used:

| | |
|---|---|
| Pulped Wood fiber sheets | 240 g |
| Sodium bentonite clay | 280 g |
| Water | 1300 g |

Fiber sheets were cut into smaller pieces and soaked in the indicated quantity of water, in a Hobart mixing bowl (Hobart Corporation, 701 S. Ridge Ave. Troy, Ohio 45374). After the fiber was hydrated and softened by soaking for a few minutes, the mixer was used to break up the sheets into small clumps (about ⅛ inch). The sodium bentonite clay was added and mixed thoroughly into the fiber/water mixture. The mixer was run for about 15 minutes at medium or high-speed make the mixture uniform and to complete the dispersion of the fiber into the clay gel.

Example 2

The following Example illustrates an exemplary method for making a basic fiber dispersed composite matrix using wood fiber, kaolin clay, and water to produce the mixture comprising well-dispersed fiber. Other than the use of kaolin clay instead of sodium bentonite clay, the processing was the same as in Example 1. The following quantities were used:

| | |
|---|---|
| Pulped Wood fiber sheets | 62.7 g |
| Kaolin clay | 315 g |
| Water | 370 g |

Example 3

The following Example illustrates an exemplary method for making a fiber dispersed composite comprising a filler and a mold release agent.

The mixture was prepared as in Example 1, with the additional steps of adding the filler and mold release agent as described below. The mixture comprising the fiber, water, clay, fillers and mold release agent was dried, extruded, and used to make water resistant parts by injection molding. Injection molding is known in the art (see e.g., Rosato, Dominick V. et al., eds (2000) Injection Molding Handbook (3rd Edition). Springer-Verlag, which is incorporated herein by reference). The following materials were used:

| | |
|---|---|
| Pulped Wood fiber sheets | 370.5 g |
| Sodium bentonite clay | 247 g |
| Ground limestone | 228.8 g |
| Erucamide (mold release) | 15.5 g |
| Water | 2189 g |

The fiber sheets were cut into smaller pieces and soaked in the total quantity of water in a Hobart mixing bowl. The limestone was added to the wet fiber. After the fiber was hydrated and softened by soaking for a few minutes, the mixer was used to break up the sheets into small clumps (about ⅛ inch). The sodium bentonite clay was added and mixed thoroughly into the fiber/limestone/water mixture. The mixer was run for about 15 minutes at medium or high-speed make the mixture uniform and to complete the dispersion of the fiber into the clay gel. The mixture was tested for fiber dispersion by squeezing a small dollop of dough between two Plexiglas plates. The fiber was well-dispersed because no visible clumps of fiber were observed. To complete the batch, the erucamide was added with mixing.

Next the mixture was dried and pelletized. For convenience in the laboratory, the dough was placed between two pieces of plastic wrap and rolled into flat sheets. The flat sheets were dried in trays at 80° C. The dried sheets were cut into thin strips and these strips were pelletized. These fiber pellets were isolated as an intermediate. The fiber pellets can be used for any processing that requires well-dispersed fiber.

Example 4

The following Example illustrates an exemplary method for making a fiber dispersed composite comprising a thermoplastic polymers. This Example is similar to Example 3, but the low melting, biodegradable, Ecoflex thermoplastic polymer was added as a powder to act as a binder during processing.

| | |
|---|---|
| Pulped Wood fiber sheet | 370.5 g |
| Sodium bentonite clay | 247 g |
| Ground limestone | 228.8 g |
| Erucamide (mold release) | 15.5 g |
| Water | 2189 g |
| Ecoflex SBX 700 | 617.5 g |
| Polylactic acid (PLA) | 1657.5 g |

The mixing step is identical to Example 3 through the erucamide addition. At this time, all the Ecoflex was added as a powder and mixed thoroughly into the batch.

Next, the mixture was dried and pelletized. For convenience in the laboratory, the dough was placed between two pieces of plastic wrap and rolled into flat sheets. The flat sheets were dried in trays at 80° C. The dried sheets were then heated to 150° C. to melt the Ecoflex and allow it to associate with the fiber and clay on a microscopic level. The Ecoflex thus acted as a binder when the sheets were cooled. The dried sheets were cut into thin strips and these strips were pelletized. These fiber pellets could have been isolated as an intermediate for alternative processing, rather than processed as shown in the rest of this example.

In the twin-screw extrusion step (twin-screw extrusion is known in the art, see e.g., J. L. White, *Twin Screw Extrusion: Technology and Principles*, Hanser Publishers, New York (1991) which is incorporated herein by reference) the fiber/Ecoflex pellets were extruded with polylactic acid polymer, which is biodegradable. All heating zones of the extruder were set at 200° C. The extruded product was collected via a rod die. The rods were cooled and pelletized.

The resulting pellets were processed in an injection-molding machine at a processing temperature of about 190° C. The parts produced were water resistant (0.3% weight gain after immersion in water for 24 hr). No undispersed fiber was observed in the parts. Mechanical testing was done on an Intron 55R4502 tester using method ASTM D638 and the data obtained are shown below. The composite material with low cost fiber and filler had mechanical properties that were comparable to the more expensive polymer-only blend.

|  | Stress at max load (MPa) | % strain at max load (%) | Young modulus (MPa) |
|---|---|---|---|
| clay/fiber/filler/PLA-Ecoflex blend | 20.8 | 7.9 | 1082 |
| PLA-Ecoflex blend | 22.7 | 7.1 | 1136 |

Example 5

The following Example illustrates an exemplary method for making a fiber dispersed composite comprising using a polyethylene polymer in place of the PLA/Ecoflex polymer blend used in Example 4. The following materials were used:

| Pulped Wood fiber sheets | 370.5 g |
|---|---|
| Sodium bentonite clay | 370.5 g |
| Ground limestone | 228.8 g |
| Water | 1682 g |
| Low density polyethylene pellets | 2263 g |

The fiber sheets were cut into smaller pieces and soaked in the total quantity of water in a Hobart mixing bowl. The limestone was added to the wet fiber. After the fiber was hydrated and softened by soaking for a few minutes, the mixer was used to break up the sheets into small clumps (about ⅛ inch). The sodium bentonite clay was added and mixed thoroughly into the fiber/limestone/water mixture. The mixer was run for about 15 minutes at medium or high-speed make the mixture uniform and to complete the dispersion of the fiber into the clay gel.

The dough was extruded through a pasta making attachment for the Hobart mixer. The extruded strands were dried at 80° C. for 4 hours. The dried strands were broken into pellet-sized pieces by placing the dried strands into the bowl of Hobart mixer running at medium speed. These fiber pellets could have been isolated as an intermediate for alternative processing, rather than processed as shown in the rest of this example.

In the twin-screw extrusion step, the fiber pellets were extruded with low density polyethylene. The heating zones of the extruder were set at 115-140° C. The extruded product was collected via a rod die. The rods were cooled and pelletized.

These pellets were processed in an injection-molding machine at a processing temperature of about 140-170° C. Mechanical testing was done on an Instron 55R4502 tester using method ASTM D638 and the resulting data are shown below. The lower cost composite is stronger but less ductile than the low density polyethylene pellets processed in the same way.

|  | Stress at max load (MPa) | % strain at max load (%) | Young modulus (MPa) |
|---|---|---|---|
| clay/fiber/filler/LD polyethylene | 11.8 | 9.7 | 394 |
| low density polyethylene | 10.5 | 81 | 104 |

Example 6

The following example is similar to Example 1 except that a 5% hydroxypropylcellulose solution is added to bind the clay and fiber. The following materials were used:

| Pulped Wood fiber sheets | 31.4 g |
|---|---|
| Sodium bentonite clay | 20.9 g |
| Hydroxypropylcellulose (Klucel EF) solids (used as 5% solution) | 2.19 g |
| Water | 185 g |

The fiber was dispersed in the clay and water using the procedure of Example 1. A 5% hydroxypropylcellulose solution was prepared by slowly adding the solids to water with vigorous agitation, so as to wet the solids uniformly before dissolution in order to avoid forming lumps. The 5% hydroxypropylcellulose solution was mixed into the dough.

The dough was spread into thin sheets and dried. For convenience in the laboratory, the dough was placed between two pieces of stiff paper and pressed into flat sheets. The dough/paper assembly was sandwiched between two pieces of perforated metal with a weight on top to allow drying while keeping the sheet flat. The sheets were dried at 80° C. Mechanical testing was done on an Instron 55R4502 tester using method ASTM D638 and the data are shown below. The tensile strength and % strain at maximum load were better than the sample with binder than for the sample without binder. The modulus was about the same for the samples with and without binder.

|  | Stress at max load (MPa) | % strain at max load (%) | Young modulus (MPa) |
|---|---|---|---|
| Hydroxypropylcellulose binder | 3.27 | 13.1 | 79.2 |
| No binder | 1.59 | 5.9 | 88.3 |

Example 7

The following Example illustrates an exemplary method for producing kitty litter.

A sample mixture that could function well for a kitty liter was made in a Hobart mixer. 372 grams of water were mixed with 61 grams of recycled fiber. The materials were mixed at low speed until the fiber component was thoroughly wetted. The materials were then mixed at the second speed for five minutes. Sodium bentonite (62 grams) was added to the mixer and the materials were mixed for one minute at the low speed setting and an additional 5 minutes at the second speed setting. Lastly, 61 grams of 60-mesh perlite powder was added to the bowl and mixed for one minute at the low speed setting and an additional 2 minutes at the second speed setting. A dough was formed with a putty-like consistency. The dough was fed into a pasta extruder and extruded into strands that were chopped and dried at 80° C. The dried pellets had excellent clumping properties and a specific gravity of 0.5 g/cc.

Example 8

The following Example illustrates an exemplary method for making fiber reinforced cement.

A stock solution of $MgCl_2$ was made by mixing 140 g of $MgCl_2$ with 200 g of water. The mixture was stirred until all of the $MgCl_2$ had dissolved. The sample was made by adding 200 g of the $MgCl_2$ stock solution to a mixing bowl along with 61 g of softwood pulp fiber. The materials were mixed for 10 min to completely saturate the fiber pulp and break-up the sample. Forty grams of sodium bentonite were added to the saturated fiber mixture and mixed an additional 10 min until the fiber was well dispersed. Finally, 150 g of MgO cement (Fondu) were added to the mixture and vigorously mixed to form a thick paste. The sample was packed into a cylindrical mold and allowed to cure for three days. The fiber reinforced concrete was weighed, measures and tested in compression until failure to determine breaking strength. The samples were removed from the molds after 4 days. Sample properties are shown below:

Density - - - 1.55 g/cc or 96.7 lbs/ft$^3$
Shrinkage length - - - 3.5%
Shrinkage width - - - 1.6%
Strength - - - 1,513 psi

Example 9

The following Example illustrates and compares several exemplary fiber reinforced products comprising Portland cement and provides illustrative methods for making.

Portland Cement Control

A Portland cement paste was made by mixing 1034 g of Portland cement powder with 256 g water in a Hobart mixer. The ingredients were mixed for 5 min until thoroughly blended. The paste was used to fill cylindrical molds. The samples were removed from Portland Cement, Clay and Fiber A fiber dispersion was made by adding 362 g water and 61 g pulped softwood fiber. The materials were mixed for 10 min in a small bench top Hobart mixer on the second speed. Sodium bentonite (42 g) was added to the wet pulp and mixed an additional 10 min at the second speed. At this point, an additional 362 g water were blended into the fiber mixture. Finally, 450 g of Portland cement were thoroughly blended into the fiber mixture. The cement paste was packed into cylindrical molds. The samples were removed from the molds after 4 days.

Portland Cement, Clay, Fiber and Sea Sand

A fiber dispersion was made by adding 180 g water and 31 g pulped softwood fiber. The materials were mixed for 10 min in a small bench top Hobart mixer on the second speed. Sodium bentonite (21 g) was added to the wet pulp and mixed an additional 10 min at the second speed. Sea sand (340 g) and an additional 10 g of sodium bentonite were added to the mixture and thoroughly mixed for an additional 5 min. An additional 169 g of water were then mixed into the fiber blend before the addition of Portland cement (200 g). The ingredients were blended an additional 3 min and then packed into cylindrical molds. The samples were removed from the molds after 4 days.

Portland Cement, Fiber and High Wax Content

A fiber dispersion was made by adding 362 g water and 61 g pulped softwood fiber. The materials were mixed for 10 min in a small bench top Hobart mixer on the second speed. Sodium bentonite (42 g) was added to the wet pulp and mixed an additional 10 min at the second speed. At this point, an additional 421 g water were blended into the fiber mixture. At this point, 350 g of wax beads (70% paraffin, 30% polyethylene, ca. 1 mm dia.) were blended into the mix at low speed for 2 min. Finally, 450 g of Portland cement were thoroughly blended into the fiber/wax mixture. The cement paste was packed into cylindrical molds. The samples were removed from the molds after 4 days.

Portland Cement, Fiber and Low Wax Content

A fiber dispersion was made by adding 181 g water and 31 g pulped softwood fiber. The materials were mixed for 10 min in a small bench top Hobart mixer on the second speed. Sodium bentonite (21 g) was added to the wet pulp and mixed an additional 10 min at the second speed. At this point, an additional 191 g water were blended into the fiber mixture. At this point, 166 g of wax beads (70% paraffin, 30% polyethylene, ca. 1 mm dia.) were blended into the mix at low speed for 2 min. Finally, 514 g of Portland cement were thoroughly blended into the fiber/wax mixture. The cement paste was packed into cylindrical molds. The samples were removed from the molds after 4 days.

Comparison of the five samples is shown below:

|  | Control | Fiber and cement | Fiber, cement, sand |
|---|---|---|---|
| Green density | 2.13 g/cc | 1.35 g/cc | 1.61 g/cc |
| Green shrinkage length | 0.17% | 0.43% | 0.94% |
| Green shrinkage width | >0.25% | 0.01% | >0.5% |
| Oven dry density | 2.07 g/cc | 0.76 g/cc | 1.18 g/cc |
| Oven dry shrinkage length | 0.4% | 1.36% | 0.6% |
| Oven dry shrinkage dia. | >0.25% | 1.07% | 0.3% |
| Strength | 9873 psi | 475 psi | 451 psi |

|  | Control | Fiber and high wax | Fiber and low wax |
|---|---|---|---|
| Green density | 2.13 g/cc | 1.21 g/cc | 1.43 g/cc |
| Green shrinkage length | 0.17% | 0.3% | 0.34% |
| Green shrinkage width | >0.25% | 0.21% | 0.01% |
| Oven dry density | 2.07 g/cc | 0.83 g/cc | 1.15 g/cc |
| Oven dry shrinkage length | 0.4% | 0.82% | 0.36% |
| Oven dry shrinkage dia. | >0.25% | 0.8% | 0.07% |
| Strength | 9873 psi | 621 psi | 1540 psi |

Example 10

The following Example illustrates and compares several exemplary fiber reinforced products comprising Gypsum cement and provides illustrative methods for making.

In each illustrative case, Gypsum was heated overnight at 170° C. and stored in a glass container to make gypsum cement (plaster of Paris).

Gypsum Cement Control

Water (300 g) was placed in a mixing bowl and mixed at the lowest setting while adding gypsum cement powder (403 g). The ingredients were mixed an additional 2 minutes before filling cylindrical molds.

Gypsum Cement and Clay with High Fiber Levels

A fiber dispersion was made by adding 181 g water and 31 g pulped softwood fiber. The materials were mixed for 10 min in a small bench top Hobart mixer on the second speed. Sodium bentonite (21 g) was added to the wet pulp and mixed an additional 10 min at the second speed. Water (151 g) was thoroughly blended into the fiber mixture. The gypsum cement (150 g) was slowly added and thoroughly mixed with the ingredients. The mixture was used to fill cylindrical samples.

Gypsum Cement and Clay with Low Fiber Levels

A fiber dispersion was made by adding 181 g water and 31 g pulped softwood fiber. The materials were mixed for 10 min in a small bench top Hobart mixer on the second speed. Sodium bentonite (21 g) was added to the wet pulp and mixed an additional 10 min at the second speed. Water (128 g) was thoroughly blended into the fiber mixture. The gypsum cement (300 g) was slowly added and thoroughly mixed with the ingredients. The mixture was used to fill cylindrical samples.

Comparison of the three samples is shown below:

|  | Control | High fiber | Low fiber |
| --- | --- | --- | --- |
| Oven dry density | 1.24 g/cc | 0.585 g/cc | 0.77 g/cc |
| Oven dry Shrinkage length | 0.01% | 1.35% | 0.65% |
| Oven dry Shrinkage dia. | 0.01% | 1.27% | 0/01% |
| Strength | 2646 psi | 318 psi | 475 psi |

It is understood that the examples and embodiments described herein are for illustrative purposes only and that various modifications or changes in light thereof will be suggested to persons skilled in the art and are to be included within the spirit and purview of this application and scope of the appended claims. All publications, patents, and patent applications cited herein are hereby incorporated by reference for all purposes.

What is claimed is:

1. A method for substantially uniformly dispersing fiber in an aqueous clay mixture without excessive amounts of water such that a dispersed fiber/clay matrix made by the method does not require dewatering, the method comprising:
   (a) combining a mass of fiber with water;
   (b) mixing the combined fiber and water to form a mixture;
   (c) adding a clay to the mixture,
      wherein the water and clay are present in a water to clay ratio that is in a range between about 2:1 to about 15:1; and
   (d) mixing thoroughly to produce the dispersed fiber/clay matrix.

2. The method of claim 1, wherein the fiber and clay are present in a dry fiber to clay ratio that is in a range between about 0.1:1 to about 2:1.

3. The method of claim 1, wherein the fiber is selected from the group consisting of a pulped cellulosic fiber, an unpulped cellulosic fiber, a synthetic fiber, and a glass fiber or a combination of such members.

4. The method of claim 3, wherein the pulped cellulosic or unpulped cellulosic fiber is a plant derived fiber selected from the group consisting of: fiber from hardwood, softwood, cotton, jute, ramie, hemp, sisal, kenaf, and straw, or a combination of such members.

5. The method of claim 3 where the fiber is a virgin fiber.

6. The method of claim 3 where the fiber is a recycled fiber.

7. The method of claim 3, wherein the fiber is a synthetic fiber is selected from the group consisting of biodegradable synthetic fibers and non-biodegradable synthetic fibers, or a combination of such members.

8. The method of claim 1, wherein the clay is selected from the group consisting of sodium bentonite clay, kaolin clay, montmorillonite clay, fuller's earth clay, calcium bentonite clay and attapulgite clay or a combination of such members.

9. The method of claim 1, further comprising prior to or after step (d):
   (e) adding one or more additives selected from the group consisting of water, a thermoplastic, cement, fillers, processing aids, and binders; and
   (f) mixing thoroughly.

10. The method of claim 9, wherein the one or more additives comprise a binder and the binder is present in a binder to clay ratio that is in a range of between about 0.01:1 to about 0.2:1.

11. The method of claim 9, wherein the one or more additives comprise a binder and the binder is selected from the group consisting of a cellulose ether, a lignosulfonate, a polyvinylalcohol, a sugar, an oligosaccharide, and a polysaccharide or a combination of such members.

12. A method for making a fiber reinforced low density building material, the method comprising:
   (1) substantially uniformly dispersing fiber in an aqueous clay mixture without excessive amounts of water such that a dispersed fiber/clay matrix made by the method does not require dewatering, wherein the substantially uniformly dispersing comprises:
      (a) combining a mass of fiber with water;
      (b) mixing the combined fiber and water to form a mixture;
      (c) adding a clay to the mixture
         wherein the water and clay are present in a water to clay ratio that is in a range between about 2:1 to about 15:1;
      (d) mixing thoroughly to produce the dispersed fiber/clay matrix;
   (2) adding one or more additives to the dispersed fiber/clay matrix, the additive selected from the group consisting of water, a cement, fillers, processing aids, and binders; and
   (3) mixing thoroughly.

13. The method of claim 12, wherein the one or more additives comprises a filler is selected from the group consisting of calcium carbonate, talc, gypsum, perlite, aggregate, sand, ash, and starch or a combination of such members.

14. A low density building material made according to the method of claim 12, wherein the one or more additives comprises a cement that is a hydraulically settable cement.

15. The low density building material of claim 14, wherein the cement is selected from the group consisting of Portland cement, magnesium oxysulfate, magnesium oxychloride, zinc oxysulfate, zinc oxychloride, magnesium oxyphosphate, zinc oxyphosphate, alumnite cement, metal silicates such as calcium silicate and aluminum silicate, and colloidal silicic acid.

16. The low density building material of claim 14, wherein
   (i) the clay and fiber are present in a clay to fiber ratio that is in a range of between about 0.6:1 to about 3:1; and
   (ii) the fiber and cement are present in a fiber to cement ratio that is in a range of between about 1:1 to about 1:30.

17. A method for making a fiber reinforced thermoplastic product, the method comprising:
   (1) substantially uniformly dispersing fiber in an aqueous clay mixture without excessive amounts of water such that a dispersed fiber/clay matrix made by the method does not require dewatering, wherein the substantially uniformly dispersing comprises (a) combining a mass of fiber with water;
(b) mixing the combined fiber and water to form a mixture;
(c) adding a clay to the mixture
   wherein the water and clay are present in a water to clay ratio that is in a range between about 2:1 to about 15:1;
(d) mixing thoroughly to produce the dispersed fiber/clay matrix;
(2) adding one or more additives to the dispersed fiber/clay matrix, the additive selected from the group consisting of water, a thermoplastic polymer, fillers, processing aids, and binders or a combination of such members;
(3) mixing thoroughly;
(4) rolling the mixture into sheets;
(5) drying the rolled sheets;
(6) heating the dried sheets to make the sheets flexible, and
(7) thermoforming the dried sheets into target shapes.

18. The method of claim 17, wherein the one or more additives comprises a binder selected from the group consisting of a thermoplastic polymer and a wax.

19. The method of claim 17, wherein the one or more additives comprises a filler that is selected from the group consisting of calcium carbonate, talc, gypsum, and starch or a combination of such members, and wherein the filler and clay are present in a filler to clay ratio that is in a range that is between about 0.1:1 to about 7:1.

20. The method of claim 17, wherein the one or more additives comprises a processing aid that is selected from the group consisting of mold release agents, plasticizers, and lubricants or a combination of such members.

21. A fiber reinforced thermoplastic product made according to the method of claim 17.

22. The fiber reinforced thermoplastic product of claim 21, wherein:
(i) the thermoplastic polymer is biodegradable; and
(ii) the fiber is a cellulosic fiber.

23. A method for making a fiber reinforced thermoplastic product, the method comprising:
(1) substantially uniformly dispersing fiber in an aqueous clay mixture without excessive amounts of water such that a dispersed fiber/clay matrix made by the method does not require dewatering, wherein the substantially uniformly dispersing comprises
   (a) combining a mass of fiber with water;
   (b) mixing the combined fiber and water to form a mixture;
   (c) adding a clay to the mixture
      wherein the water and clay are present in a water to clay ratio that is in a range between about 2:1 to about 15:1;
   (d) mixing thoroughly to produce the dispersed fiber/clay matrix;
(2) adding one or more additives to the dispersed fiber/clay matrix, the additive selected from the group consisting of water, a thermoplastic polymer binder, fillers, processing aids, and other binders;
(3) mixing thoroughly;
(4) pelletizing the mixture to form pellets;
(5) drying the pellets;
(6) isolating the pellets;
(7) blending the isolated, dried pellets with a thermoplastic material by:
   (a) heating the pellets; and
   (b) extruding the heated pellets in combination with a thermoplastic polymer to form rods;
(8) pelletizing the rods; and
(9) processing the pelletized rods in an injection-molding machine to form a reinforced thermoplastic product.

24. The method of claim 23, wherein the one or more additives comprises a filler that is selected from the group consisting of calcium carbonate, talc, gypsum, and starch or a combination of such members, and wherein the filler and clay are present in a filler to clay ratio that is in a range that is between about 0.1:1 to about 7:1.

25. The method of claim 23, wherein the one or more additives comprises a processing aid that is selected from the group consisting of mold release agents, plasticizers, and lubricants or a combination of such members.

26. A fiber reinforced thermoplastic product made according to the method of claim 23.

27. The fiber reinforced thermoplastic product of claim 26, wherein:
(i) the thermoplastic polymer is biodegradable; and
(ii) the fiber is a cellulosic fiber.

* * * * *